(12) United States Patent
Dwyer

(10) Patent No.: US 7,926,348 B2
(45) Date of Patent: Apr. 19, 2011

(54) METHODS AND SYSTEMS FOR MINIMIZING VIBRATION RECTIFICATION ERROR IN MAGNETIC CIRCUIT ACCELEROMETERS

(75) Inventor: Paul W. Dwyer, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 529 days.

(21) Appl. No.: 12/050,854

(22) Filed: Mar. 18, 2008

(65) Prior Publication Data
US 2009/0235745 A1 Sep. 24, 2009

(51) Int. Cl.
*G01P 15/13* (2006.01)
(52) U.S. Cl. .................. 73/514.23; 73/514.31
(58) Field of Classification Search ............ 73/514.31, 73/514.23, 514.17, 514.21, 514.29, 493, 73/514.36, 514.38
See application file for complete search history.

(56) References Cited

U.S. PATENT DOCUMENTS

| 3,702,073 A * | 11/1972 | Jacobs ..................... 73/514.32 |
| 4,726,228 A * | 2/1988 | Norling ..................... 73/514.21 |
| 4,854,169 A | 8/1989 | Sakuma et al. |
| 5,133,214 A * | 7/1992 | Hanson et al. ............. 73/514.21 |
| 5,182,949 A * | 2/1993 | Rupnick et al. ............. 73/514.38 |
| 5,557,044 A * | 9/1996 | Foote et al. ................. 73/514.23 |
| 7,191,654 B2 | 3/2007 | Dwyer et al. |
| 7,194,903 B2 * | 3/2007 | Dwyer ......................... 73/493 |
| 2007/0039388 A1 * | 2/2007 | Dwyer et al. ............. 73/514.31 |
| 2009/0205424 A1 * | 8/2009 | Roehnelt et al. ........... 73/514.31 |

FOREIGN PATENT DOCUMENTS
EP 1754974 * 2/2007
* cited by examiner

*Primary Examiner* — Helen C. Kwok
(74) *Attorney, Agent, or Firm* — Fogg & Powers LLC

(57) ABSTRACT

Systems and methods for minimizing vibration rectification error in magnetic circuit accelerometers. The systems include an accelerometer with an excitation ring that has a top piece with a lower portion inner diameter and a bottom piece having a diameter smaller than the lower portion inner diameter of the top piece. The accelerometer also includes a proof mass, a magnet mounted to the bottom piece of the excitation ring, a pole piece mounted to the magnet, and a coil attached to the proof mass that extends into a gap between the top piece of the excitation ring and the pole piece. The methods include placing a pole piece in a pole piece to lap surface fixture, placing an excitation ring top piece on an outer portion of the pole piece to lap surface fixture, and placing an excitation ring bottom piece in a lower portion of the excitation ring top piece.

20 Claims, 3 Drawing Sheets

ND SYSTEMS FOR MINIMIZING
METHODS AND SYSTEMS FOR MINIMIZING VIBRATION RECTIFICATION ERROR IN MAGNETIC CIRCUIT ACCELEROMETERS

BACKGROUND OF THE INVENTION

Conventional magnetic return paths for accelerometers, such as the accelerometer shown in FIG. 1, create a flux distribution in an air gap between an excitation ring and a pole piece that interacts with a coil that is attached to a flexible proof mass. The flux interacts with the current in the coil to produce a rebalance force proportional to the acceleration to which the device is subjected. The flux density across the air gap is not uniform given geometric constraints of constructing useful circuits. Further, the field strength of a magnetic circuit is not constant when it interacts with the coil with changing direction of current flow. The field strength follows the minor loop slope of the magnet. If the device is subjected to vibration which can change the orientation of the coil with respect to the flux and the amplitude of the flux itself, the output of the device will change independently of the acceleration being measured. This error is called vibration rectification error (VRE).

For any given magnetic circuit, there is an optimum location of the coil in the field to minimize VRE. Means have been developed to cope with this problem using spacers located between the coil and the proof mass. However, the spacers increase the pendulosity, add cost and increase the difficulty of manufacturing. Also, the desire to minimize the output change under vibration has led to the development of short coils that need to be extremely clean and uniformly manufactured to avoid contact with the components that define the air gap.

Typical manufacturing techniques present difficulties in producing a highly finished yet clean excitation ring because excitation rings are generally produced as one piece units that are difficult to machine and clean on their inner surface. This can result in small particles remaining that can interfere with proper operation of the accelerometer. Additionally, previous manufacturing techniques including those that use two piece excitation rings have a number of sources of possible error in the geometric configuration of the pole piece and magnet in relation to the coil, upper surface of the excitation ring, and proof mass. Bonding layers between the pole piece and magnet and between the magnet and excitation ring as well as the height of the pole piece and the height of the magnet are variable and can result in variability in the position of the pole piece and magnet between different accelerometers that results in increased vibration rectification error because the pole piece is not in an optimal position in relation to the other parts of the accelerometer.

SUMMARY OF THE INVENTION

The present invention includes systems and methods for minimizing vibration rectification error in magnetic circuit accelerometers. An example system is an accelerometer with an excitation ring that has a top piece with a lower portion inner diameter and a bottom piece having a diameter smaller than the lower portion inner diameter of the top piece. The accelerometer also includes a proof mass, a magnet mounted to the bottom piece of the excitation ring, a pole piece mounted to the magnet, and a coil attached to the proof mass that extends into a gap between the top piece of the excitation ring and the pole piece.

In accordance with further aspects of the invention, the bottom piece has a diameter approximately 3 mils smaller than the lower portion inner diameter of the top piece.

In accordance with other aspects of the invention, the pole piece is mounted to the magnet using a conductive epoxy and the magnet is mounted to the bottom piece using a conductive epoxy.

In accordance with still further aspects of the invention, the accelerometer also includes a stator mounted to the proof mass.

In accordance with yet other aspects of the invention, the accelerometer includes a bellyband attached to the excitation ring top piece and the stator such that the excitation ring top piece, the proof mass, and the stator are held in a fixed relationship to each other by the bellyband.

In accordance with additional aspects of the invention, the excitation ring top piece has an L-shaped cross-section.

In accordance with still another aspect of the invention, the methods include placing a pole piece in a pole piece to lap surface fixture, placing an excitation ring top piece on an outer portion of the pole piece to lap surface fixture, and placing an excitation ring bottom piece in a lower portion of the excitation ring top piece.

In accordance with still further aspects of the invention, the methods include applying a first adhesive layer to the pole piece, placing a magnet on the first adhesive layer, and applying a second adhesive layer to the magnet such that when the excitation ring bottom piece is placed in the lower portion of the excitation ring top piece, the excitation ring bottom piece is placed on the second adhesive layer.

In accordance with yet other aspects of the invention, the methods include using a conductive epoxy for the first and second adhesive layers.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
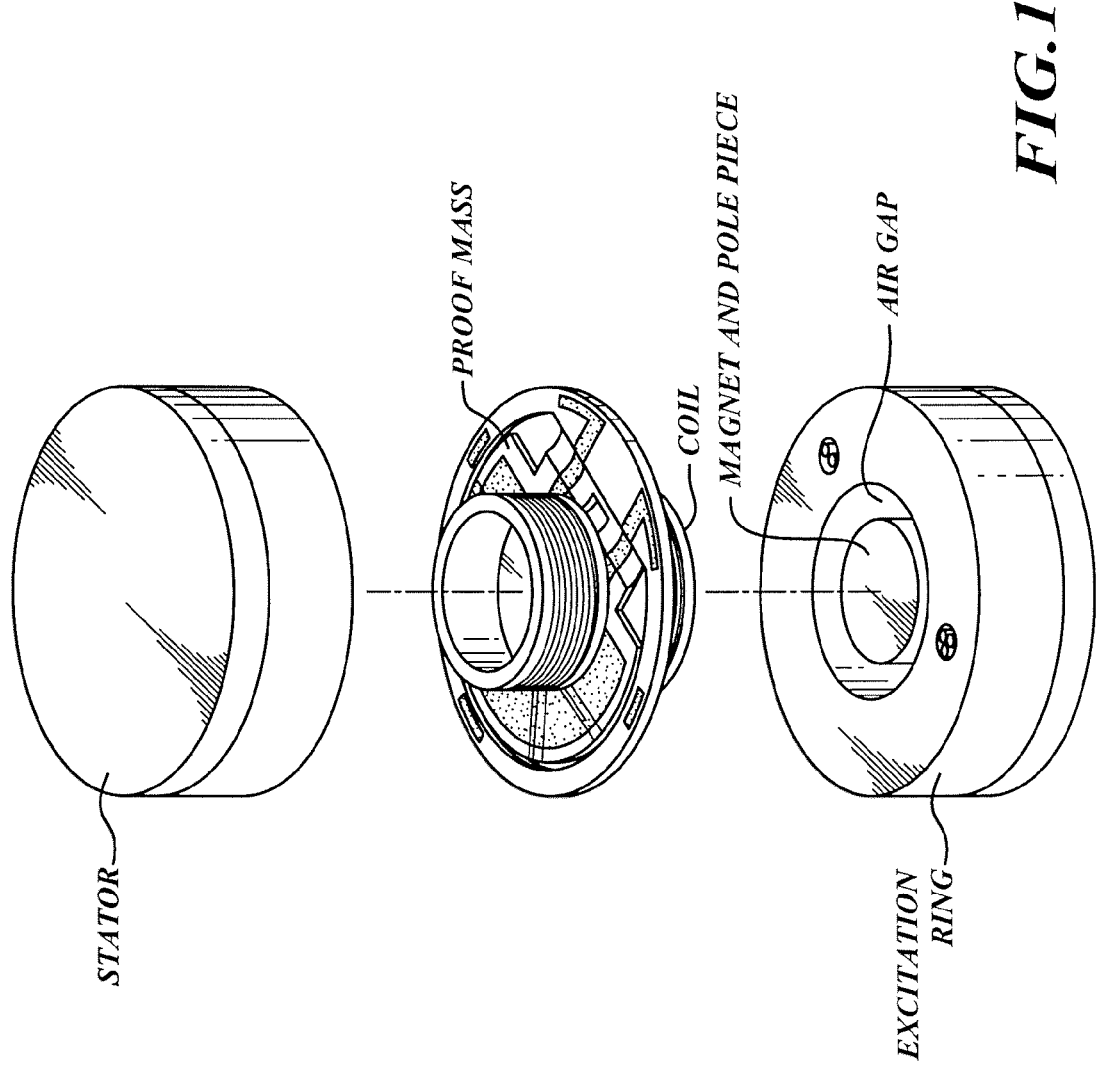
FIG. 1 shows an accelerometer formed in accordance with the prior art.
Figure 2:
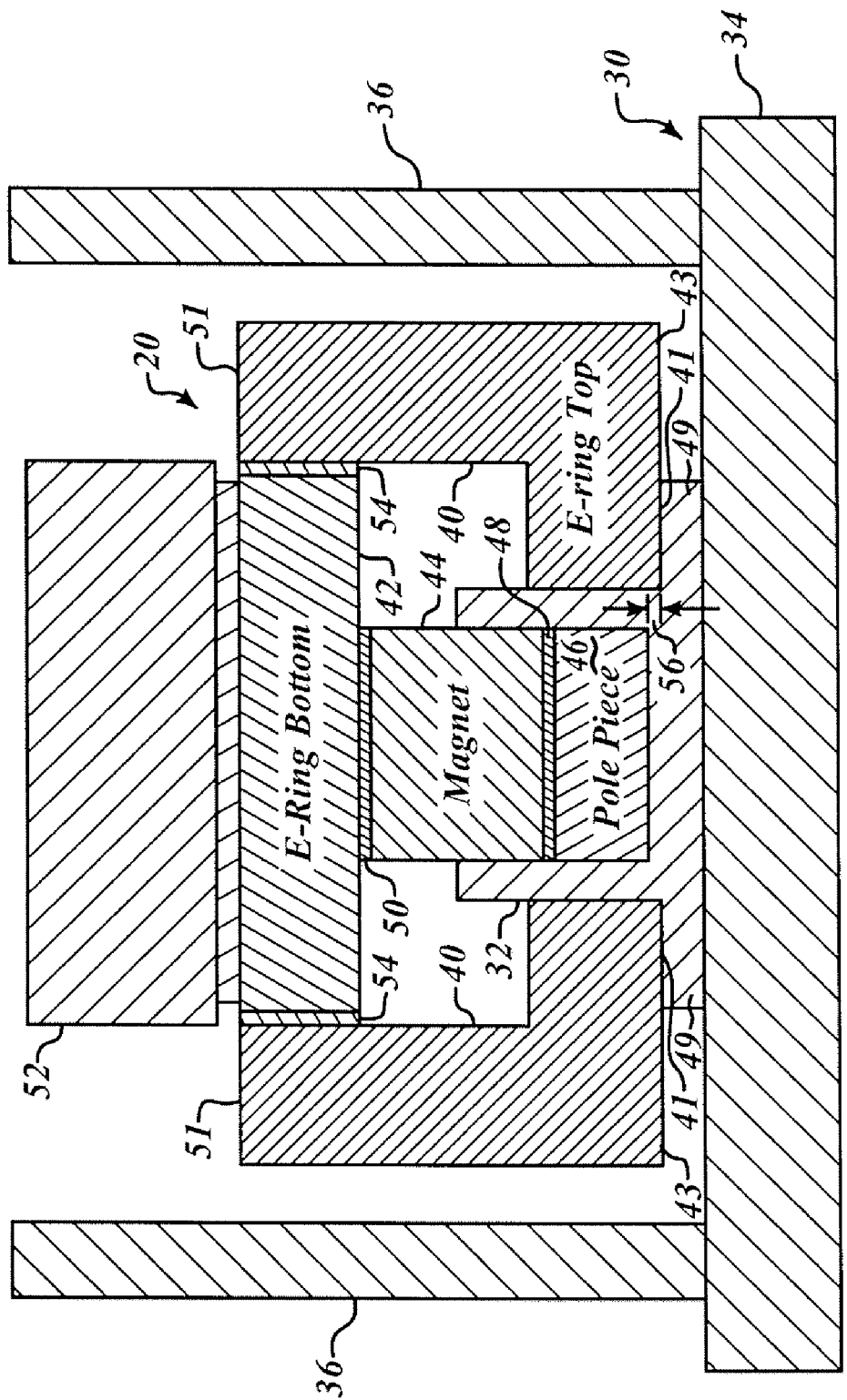
FIG. 2 is a cross-sectional diagram of a portion of an accelerometer being assembled using a tooling device.

FIG. 2 is a cross-sectional diagram of a portion of an accelerometer 20 being assembled using a tooling device 30. In the example shown, the tooling device 30 includes a mounting structure that may be referred to as a pole piece to lap surface fixture 32 in some examples, a base 34, and a sidewall 36. The accelerometer 20 includes an excitation ring (E-ring) top piece 40 into which an excitation ring bottom piece 42 is positioned. The tooling device 30 provides for highly accurate alignment of the parts of the accelerometer 20. The E-ring top piece 40 includes a lap surface 41 at a first end 43 of the E-ring top piece 40.

A magnet 44 is mounted to the E-ring bottom piece 42 and a pole piece 46 is mounted to the magnet 44. The magnet 44 and pole piece 46 extend upward away from the E-ring bottom piece 42 toward a gap in the E-ring top piece 40. The accelerometer 20 is shown upside down in FIG. 2, so the magnet 44 and the pole piece 46 are shown extending downward away from the E-ring bottom piece 42. The E-ring top piece 40 may also be referred to as an E-ring first piece and the E-ring bottom piece 42 may also be referred to as an E-ring second piece in some examples.

In an example, the E-ring top piece 40 and bottom piece 42 are manufactured separately and heat treated. The E-ring top piece 40 is then rough lapped to a predefined finish quality on at least one surface. In an example, a lapped finish is applied to the lap surface 41 and the E-ring top piece 40 is then cleaned of residual particulate from the lapping operation. The E-ring bottom piece 42, magnet 44, and pole piece 46 are air abraded, and all parts including the E-ring top piece 40, the bottom piece 42, the magnet 44, and the pole piece 46 are cleaned. Then, the accelerometer 20 is assembled. In an example, assembly of the accelerometer 20 is performed using a clean bench, which is an assembly bench that has a laminar stream of air flowing over the bench that has had airborne particles removed from the air, such as by using HEPA filters.

In an example assembly process, the pole piece 46 is placed in the pole piece to lap surface fixture 32. Then, a first silver filled conductive epoxy layer 48 (e.g. Ablebond® 84-1LMIT produced by Ablestik Laboratories) is applied to the pole piece 46. Next, the magnet 44 is attached to the pole piece 46 by placing the magnet 44 in the pole piece to lap surface fixture 32 on the first epoxy layer 48. Then, a second silver filled conductive epoxy layer 50 (e.g. Ablebond® 84-1LMIT produced by Ablestik Laboratories) is applied to the magnet 44. Next, the E-ring top piece 40 is placed in the tooling device 30 on an outer portion 49 of the pole piece to lap surface fixture 32. Then, the E-ring bottom piece 42 is placed inside a second end 51 of the E-ring top piece 40 on the epoxy layer 50. Then, a loading device 52, such as a weight or spring for example, is used to apply a force to the E-ring bottom piece 42 to press a stack that includes the E-ring bottom piece 42, the magnet 44, and the pole piece 46 against the pole piece to lap surface fixture 32. In an example, the loading device 52 applies pressure to the E-ring bottom piece 42 equivalent to that provided by a weight of at least 200 grams. Next, an unfilled, low viscosity epoxy layer 54 (e.g. TRA-BOND 931-1 produced by TRA-CON, Inc.) is applied between the E-ring bottom piece 42 and E-ring top piece 40. An epoxy or other adhesive other than TRA-BOND 931-1 may be used. Such an alternative epoxy would typically have a low viscosity so that it effectively wicks into a gap between the E-ring top piece 40 and the E-ring bottom piece 41. Such an alternative epoxy would also typically have a bond strength that will hold the E-ring top piece 40 and E-ring bottom piece 42 together and provide geometric stability over time to maintain the same flux level in the magnetic circuit. Application of the epoxy layer 54 may be performed by wicking the epoxy layer 54 into a gap between the E-ring top piece 40 and the E-ring bottom piece 42, for example. The epoxy layers 48, 50, and 54 are then cured such as by heating for approximately 1 hour at 150 degrees Celsius for example. Although the epoxy layers 48, 50, 54 are cured at the same time in this example, they may be cured sequentially or under different conditions in other examples.

Figure 3:
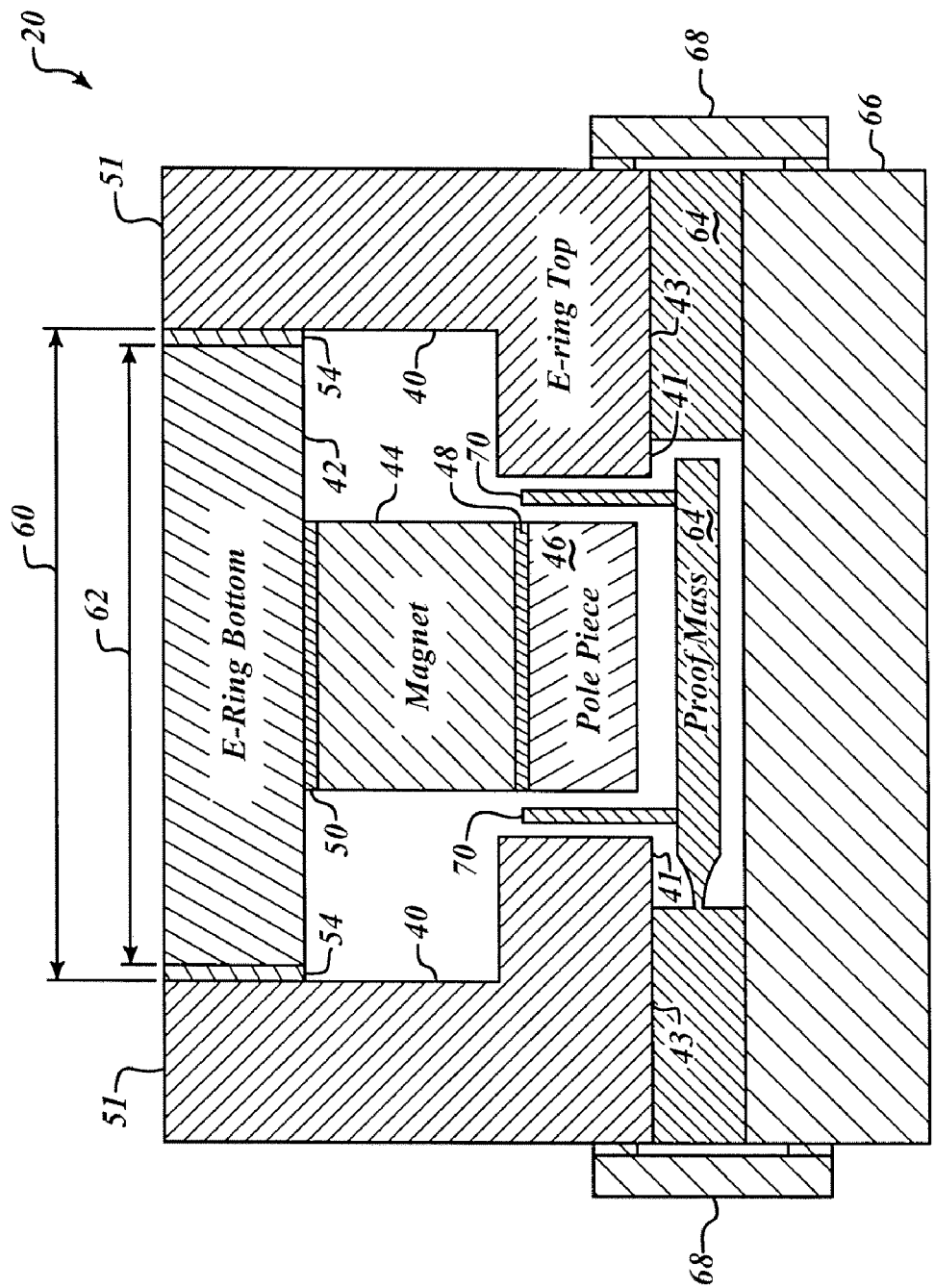
FIG. 3 is a cross-sectional diagram of an accelerometer formed in accordance with an example of the invention.

Use of the pole piece to lap surface fixture 32 in assembly of the accelerometer 20 results in a pole piece to lap surface distance 56 that may be controlled to high tolerances by controlling the dimensions of the pole piece to lap surface fixture 32. This results in the pole piece to lap surface distance 56 being consistent between different accelerometers manufactured in this way and allows the pole piece to lap surface distance 56 to be controlled without undue concern about variability in the magnet 44 height, the pole piece 46 height, the thickness of the first epoxy layer 48, and the thickness of the second epoxy layer 50. The tooling device 30 is then removed and additional components are added to the accelerometer 20 to produce the structure shown in FIG. 3. FIGS. 2 and 3 are not necessarily drawn to scale. Although FIGS. 2 and 3 show various parts of the accelerometer 20 in cross-sectional views, it should be understood that the parts have a volume. In an example embodiment, the E-ring top piece 40 and the E-ring bottom piece 42 are cylindrical. In some examples, other components such at the magnet 44 and the pole piece 46 may also be cylindrical in shape.

FIG. 3 is a cross-sectional diagram of the accelerometer 20 shown in FIG. 2 after the tooling device 30 has been removed and additional components have been added. FIG. 3 also shows that the E-ring top piece 40 includes a lower portion inner diameter 60 at the second end 51 that is greater than a diameter 62 of the E-ring bottom piece 42. This allows the E-ring bottom piece 42 to slide into the E-ring top piece 40 during the assembly described with respect to FIG. 2. In an example, the lower portion inner diameter 60 is 0.75±0.001 inches and the diameter 62 is 0.747±0.001 inches resulting in a difference in diameter of 0.003±0.002 inches (3±2 mils or a difference in diameter between 1 and 5 mils). In an example, the E-ring bottom piece 42 has a diameter approximately 3 mils smaller than the lower portion inner diameter of the E-ring top piece 40. Although the E-ring top piece 40 has an L-shaped cross-section in this example, the E-ring top piece 40 may have other cross-sectional profiles in other examples such as a generally L-shaped profile with one or more rounded corners. Additionally, other sized configurations can be used provided the diameter 62 of the E-ring bottom piece 42 is smaller than the lower portion inner diameter 60 of the E-ring top piece 40.

After the tooling device 30 is removed, a proof mass 64 is added on top of the E-ring top piece 40 and a stator 66 including accelerometer electronics is mounted to a fixed portion of the proof mass 64. Then, the proof mass 64 and stator 66 are held in place in relation to the E-ring top piece 40 such as by using a bellyband 68 for example. It should be understood that it is an outer rigid portion of the proof mass 64 that is held in place in relation to the E-ring top piece 40 and that other portions of the proof mass 64 will flex during operation of the accelerometer 20. A coil 70 is also shown extending from the proof mass 64 into a gap between the pole piece 46 and the E-ring top piece 40. In an example, the lap surface 41 also functions as a ground plate of a capacitor formed between the lap surface 41 and a metallized plate (not shown) on the proof mass 64. A mirror image version of the accelerometer portion of FIG. 2 can also be created and attached to a second side of the proof mass 64 to increase common-mode cancellation of stresses and magnetic behavior over a predefined temperature range. Some or all assembly of the accelerometer 20 may be performed in a clean room in some examples.

While the preferred embodiment of the invention has been illustrated and described, as noted above, many changes can be made without departing from the spirit and scope of the invention. For example, other types of epoxy or types of adhesive other than epoxy may be used and methods of mounting and attachment other than the use of adhesives may be used in some examples. Additionally, although a single sided accelerometer is described, double sided accelerometers may also be formed using similar two piece excitation rings in some examples. Other types of tooling devices that use the pole piece to lap surface fixture 32 may also be used in some examples. Differing step orders in assembling the accelerometer 20 may be followed in some examples and/or some parts may be preassembled before combining with other parts such as by attaching the magnet 44 to the pole piece 46 before insertion into the pole piece to lap surface fixture 32 for example. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An accelerometer comprising:
   a proof mass;
   at least one excitation ring comprising:
      a first piece having a first inner diameter at a first end and a second inner diameter at a second end; and
      a second piece having a third diameter,
      wherein the third diameter is smaller than the second inner diameter;
   at least one magnet mounted to the second piece of the excitation ring;
   at least one pole piece mounted to the at least one magnet; and
   at least one coil attached to the proof mass,
   wherein the first piece of the excitation ring is adjacent to the pole piece across a gap at the first end of the first piece and wherein the coil extends into the gap.

2. The accelerometer of claim 1, wherein the third diameter is between 1 and 5 mils smaller than the second inner diameter of the first piece.

3. The accelerometer of claim 2, wherein the third diameter is approximately 3 mils smaller than the second inner diameter of the first piece.

4. The accelerometer of claim 1, wherein the at least one pole piece is mounted to the at least one magnet using a conductive epoxy.

5. The accelerometer of claim 4, wherein the at least one magnet is mounted to the second piece of the excitation ring using a conductive epoxy.

6. The accelerometer of claim 5, wherein the second piece is mounted to the first piece using epoxy.

7. The accelerometer of claim 1, further comprising a stator mounted to a fixed portion of the proof mass, wherein the stator includes accelerometer electronics.

8. The accelerometer of claim 7, further comprising a bellyband attached to the excitation ring first piece and the stator such that the excitation ring first piece, the proof mass, and the stator are held in a fixed relationship to each other by the bellyband.

9. The accelerometer of claim 1, wherein the excitation ring first piece has an L-shaped cross-section.

10. The accelerometer of claim 1, wherein the third diameter is larger than a diameter of the pole piece.

11. A method of aligning components of an accelerometer, the method comprising:
    aligning a magnet and pole piece component with a first piece of an excitation ring using a mounting structure; and
    attaching an excitation ring second piece to the excitation ring first piece and to the magnet and pole piece component
    wherein aligning the magnet and pole piece component with the first piece of the excitation ring comprises placing a first end of the excitation ring first piece on an outer portion of the mounting structure.

12. The method of claim 11, wherein the mounting structure provides an accurate spacing between the magnet and pole piece component and the first piece as well as a gap for a coil.

13. The method of claim 11, wherein aligning the magnet and pole piece component with the first piece of the excitation ring comprises:
    placing a pole piece in the mounting structure;
    applying a first adhesive layer to the pole piece; and
    attaching a magnet to the first adhesive layer.

14. The method of claim 13, wherein attaching the excitation ring second piece to the first excitation ring piece and to the magnet and pole piece component comprises:
    applying a second adhesive layer to the magnet;
    placing the excitation ring second piece on the second adhesive layer;
    applying a force to the excitation ring second piece to press a stack that includes the excitation ring second piece, the magnet, and the pole piece against the mounting structure; and
    applying a third adhesive layer between the excitation ring second piece and the excitation ring first piece.

15. The method of claim 14, wherein the first adhesive layer is a conductive epoxy and the second adhesive layer is a conductive epoxy.

16. The method of claim 14, wherein the third adhesive layer is an unfilled, low viscosity epoxy.

17. The method of claim 14, further comprising curing the first, second, and third adhesive layers.

18. The method of claim 17, wherein curing is performed for approximately 1 hour at approximately 150 degrees Celsius.

19. The method of claim 14, further comprising:
    removing the mounting structure;
    attaching a proof mass with a coil to the excitation ring first piece; and
    attaching a stator to the proof mass.

20. The method of claim 19, further comprising attaching a bellyband to the excitation ring first piece and the stator such that the excitation ring first piece, the proof mass, and the stator are held in a fixed relationship to each other.

* * * * *